US009430364B1

(12) United States Patent
Ryan et al.

(10) Patent No.: US 9,430,364 B1
(45) Date of Patent: *Aug. 30, 2016

(54) SYSTEMS, METHODS, AND APPARATUSES FOR TESTING MOBILE DEVICE APPLICATIONS

(71) Applicant: Mobile Labs, LLC, Atlanta, GA (US)

(72) Inventors: Michael Ryan, Marietta, GA (US); Stephen Orlando, Cumming, GA (US); Karen Beatrice, Atlanta, GA (US); Mackenzie Straight, Riverview, FL (US); Joseph Dudar, Roswell, GA (US)

(73) Assignee: Mobile Labs, LLC, Atlanta, GA (US)

( * ) Notice: Subject to any disclaimer, the term of this patent is extended or adjusted under 35 U.S.C. 154(b) by 88 days.

This patent is subject to a terminal disclaimer.

(21) Appl. No.: 14/093,854

(22) Filed: Dec. 2, 2013

Related U.S. Application Data

(60) Provisional application No. 61/732,132, filed on Nov. 30, 2012.

(51) Int. Cl.
G06F 9/44 (2006.01)
G06F 11/36 (2006.01)

(52) U.S. Cl.
CPC ........ *G06F 11/3696* (2013.01); *G06F 11/3664* (2013.01); *G06F 11/3668* (2013.01)

(58) Field of Classification Search
CPC .................................... G06F 11/3668–11/3696
USPC .................................................. 717/124–127
See application file for complete search history.

(56) References Cited

U.S. PATENT DOCUMENTS

| 6,662,217 | B1 | 12/2003 | Godfrey et al. |
| 6,775,824 | B1 * | 8/2004 | Osborne, II ......... G06F 11/3664 714/46 |
| 7,286,802 | B2 | 10/2007 | Beyme et al. |
| 7,339,891 | B2 | 3/2008 | Binder et al. |
| 7,694,181 | B2 * | 4/2010 | Noller ................. G06F 11/3688 714/38.11 |
| 7,881,491 | B2 | 2/2011 | Mizrachi |

(Continued)

OTHER PUBLICATIONS

Service-Oriented Paradigms in Industrial Automation—Francois Jammes and Harm Smit—IEEE Transactions on Industrial Informatics, vol. 1, No. 1, Feb. 2005.*

(Continued)

*Primary Examiner* — Francisco Aponte
(74) *Attorney, Agent, or Firm* — Morris, Manning & Martin, LLP; Daniel E. Sineway, Esq.; Bryan D. Stewart, Esq.

(57) ABSTRACT

Aspects of the present disclosure generally relate to systems and methods for facilitating optimization of mobile application testing. In one embodiment, a mobile application testing system (MATS) allows simultaneous communication to a plurality of devices regardless of device type and operating system. Accordingly, the MATS performs mobile testing without "jail-breaking" or removing various components of the user device. In one embodiment of the present disclosure, the MATS enables users to securely test mobile applications by supporting data routing behind a security firewall utilizing a transition of communications protocols. Further, various protocols provide a data tunnel allowing multiple concurrent testing sessions for multiple users via an authentication scheme. Additionally, concurrent testing sessions may include single app testing on multiple devices or a plurality of apps testing on a plurality of devices.

20 Claims, 12 Drawing Sheets

(56) References Cited

U.S. PATENT DOCUMENTS

| | | | |
|---|---|---|---|
| 8,397,114 B2* | 3/2013 | Agrawal | G06F 11/36 714/31 |
| 8,467,987 B1* | 6/2013 | Davidson | G06F 11/3672 455/408 |
| 8,930,766 B2* | 1/2015 | Griesinger | G06F 11/3676 714/33 |
| 8,930,917 B2* | 1/2015 | Mittal | G06F 9/44 717/124 |
| 9,015,234 B2 | 4/2015 | Park et al. | |
| 9,015,654 B2 | 4/2015 | Kaasila et al. | |
| 9,071,989 B2 | 6/2015 | Capers et al. | |
| 9,166,809 B2* | 10/2015 | Chowdhury | H04L 12/2697 |
| 2005/0130645 A1 | 6/2005 | Albert Dobson et al. | |
| 2006/0085158 A1 | 4/2006 | Cakiner | |
| 2008/0139195 A1 | 6/2008 | Marsyla et al. | |
| 2011/0185231 A1 | 7/2011 | Balestrieri et al. | |
| 2011/0320879 A1 | 12/2011 | Singh et al. | |
| 2012/0151450 A1* | 6/2012 | Saffer | G06F 11/3664 717/128 |
| 2012/0198279 A1 | 8/2012 | Schroeder | |
| 2012/0253745 A1 | 10/2012 | Dhanapal et al. | |
| 2013/0078983 A1 | 3/2013 | Doshi et al. | |
| 2013/0179858 A1* | 7/2013 | Mecke | G06F 11/3688 717/106 |
| 2013/0196600 A1 | 8/2013 | Capers et al. | |
| 2013/0263103 A1* | 10/2013 | Choudhury | G06F 9/44542 717/163 |
| 2014/0095933 A1 | 4/2014 | Griesinger et al. | |

OTHER PUBLICATIONS

Amalfitano, et al., A GUI Crawling-Based Technique for Android Mobile Application Testing, 2011 Fourth International Conference on Software Testing, Verification and Validation Workshops, IEEE, pp. 252-261.

Bayley, et al., MobiTest: A Cross-Platform Tool for Testing Mobile Applications, The Seventh International Conference on Software Engineering Advances, 2012, pp. 619-622.

* cited by examiner

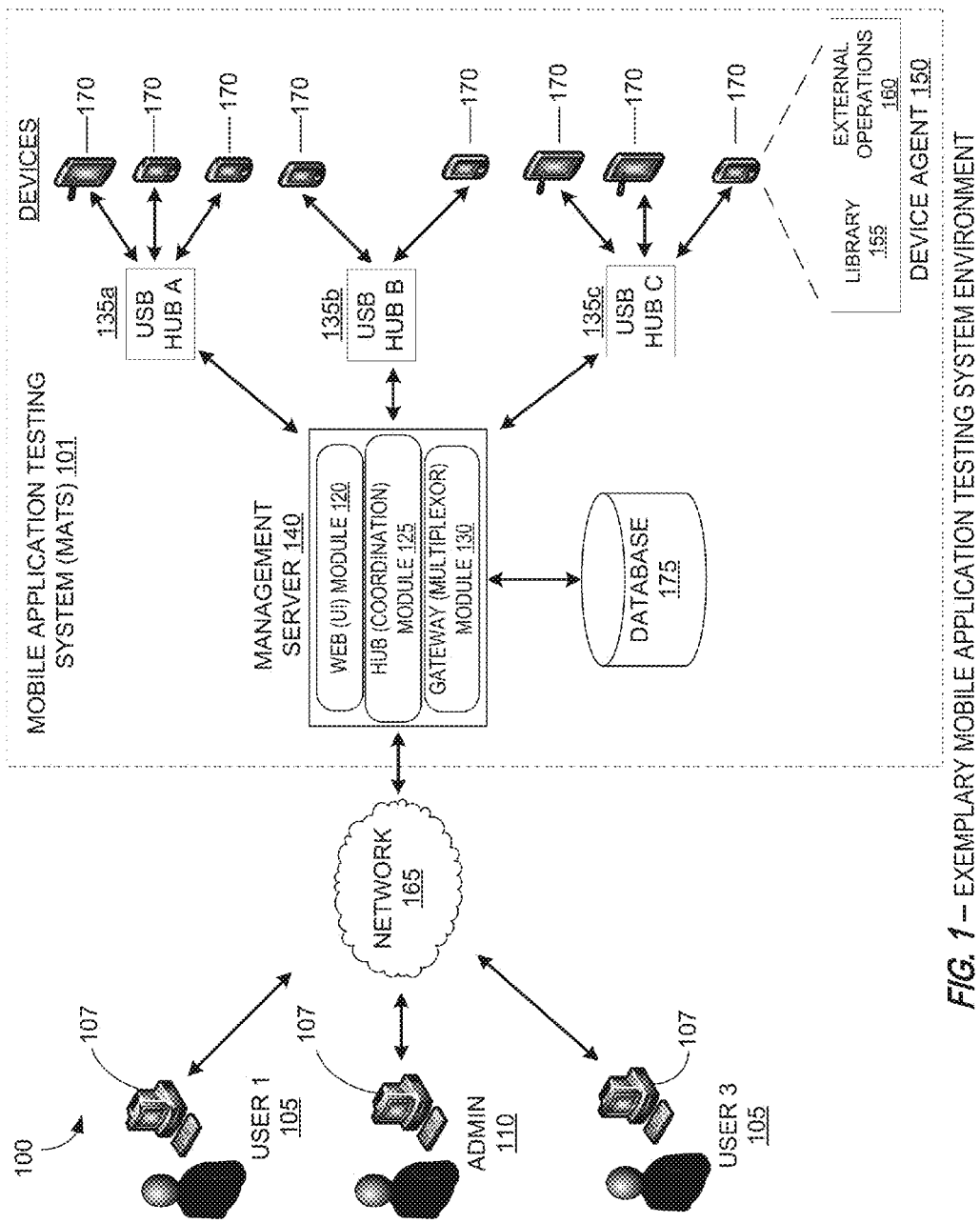
FIG. 1 – EXEMPLARY MOBILE APPLICATION TESTING SYSTEM ENVIRONMENT

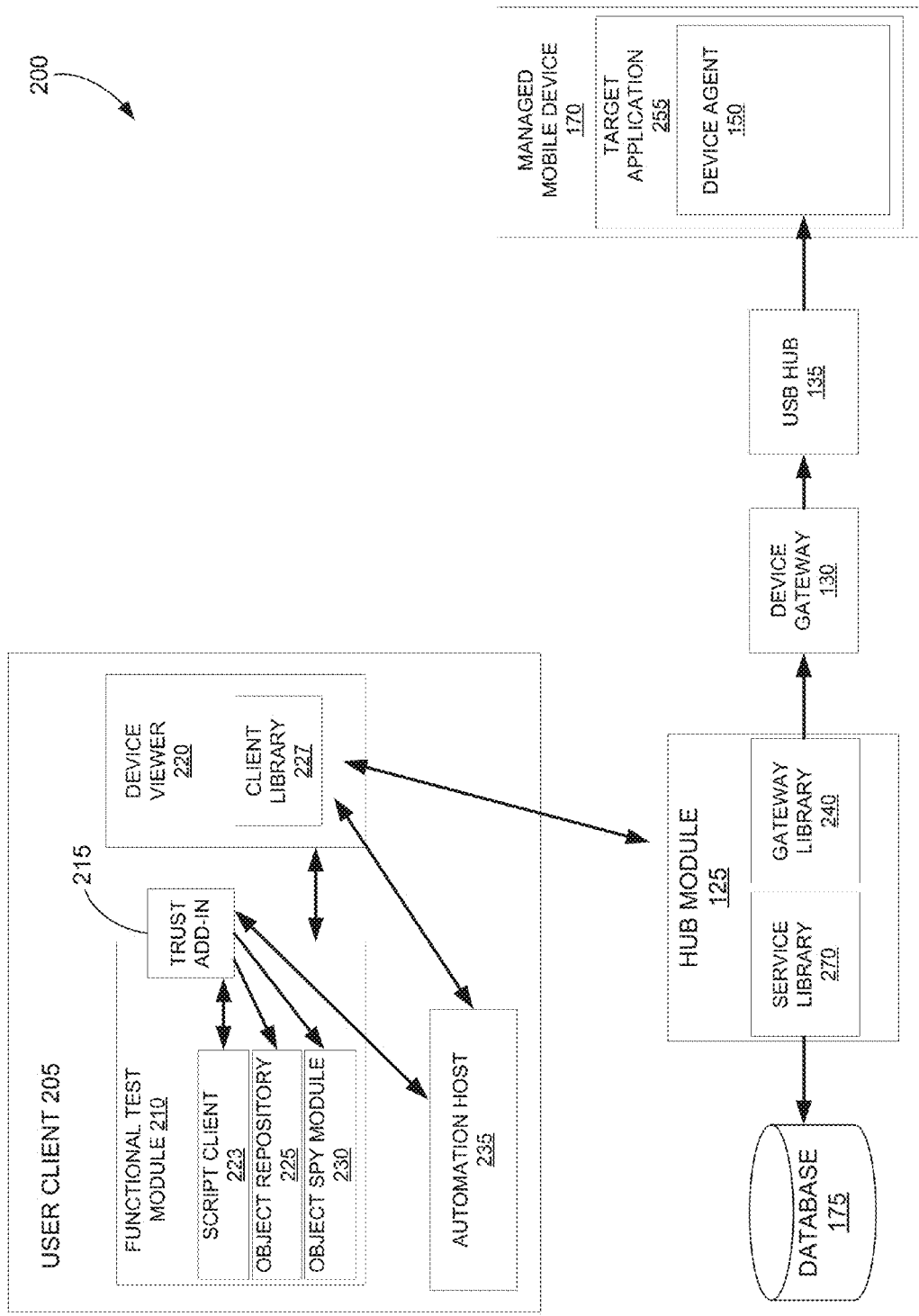
FIG. 2 — EXEMPLARY MOBILE APPLICATION TESTING SYSTEM ARCHITECTURE

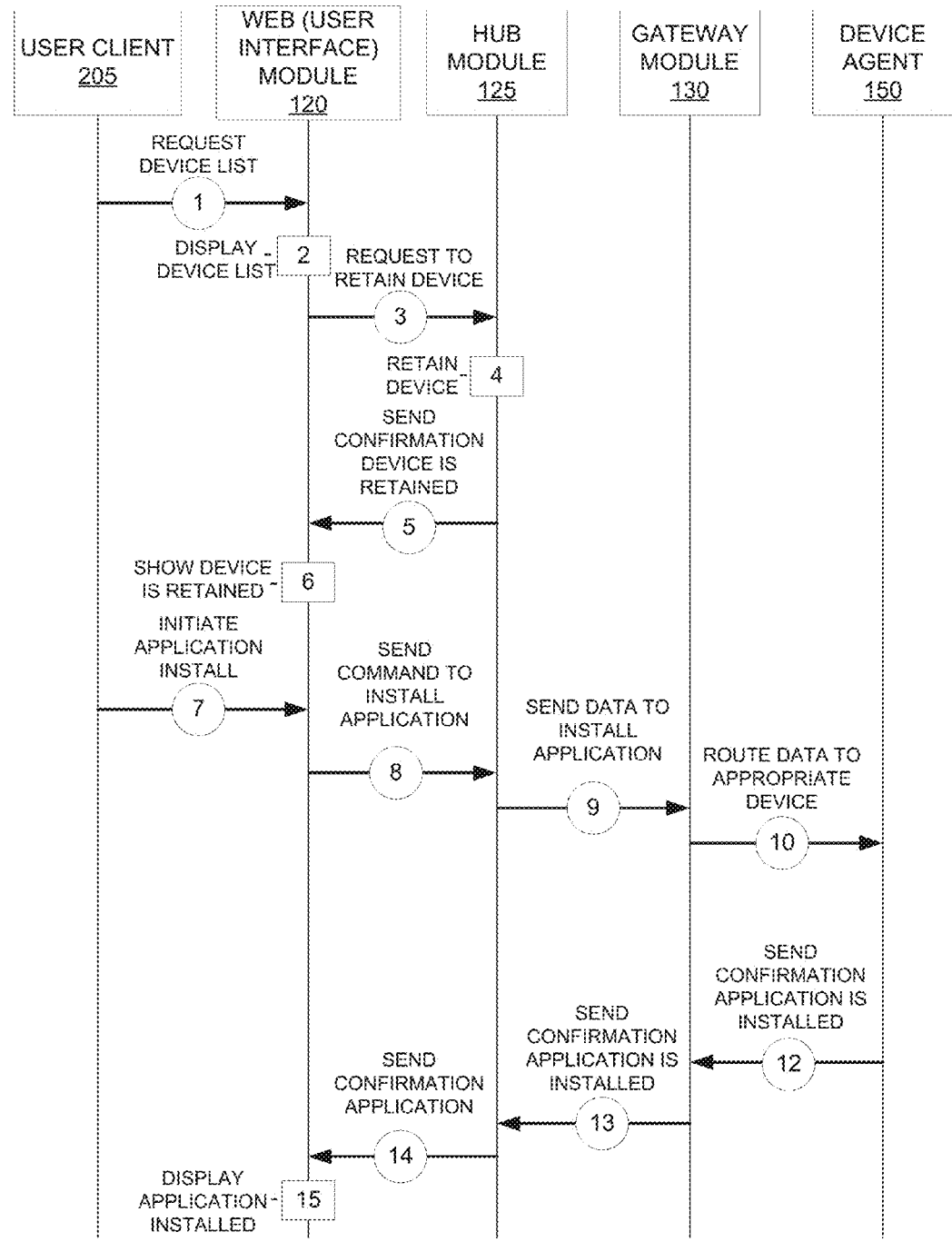
*FIG. 3A* – EXEMPLARY APPLICATION TESTING INITIATION PROCESS

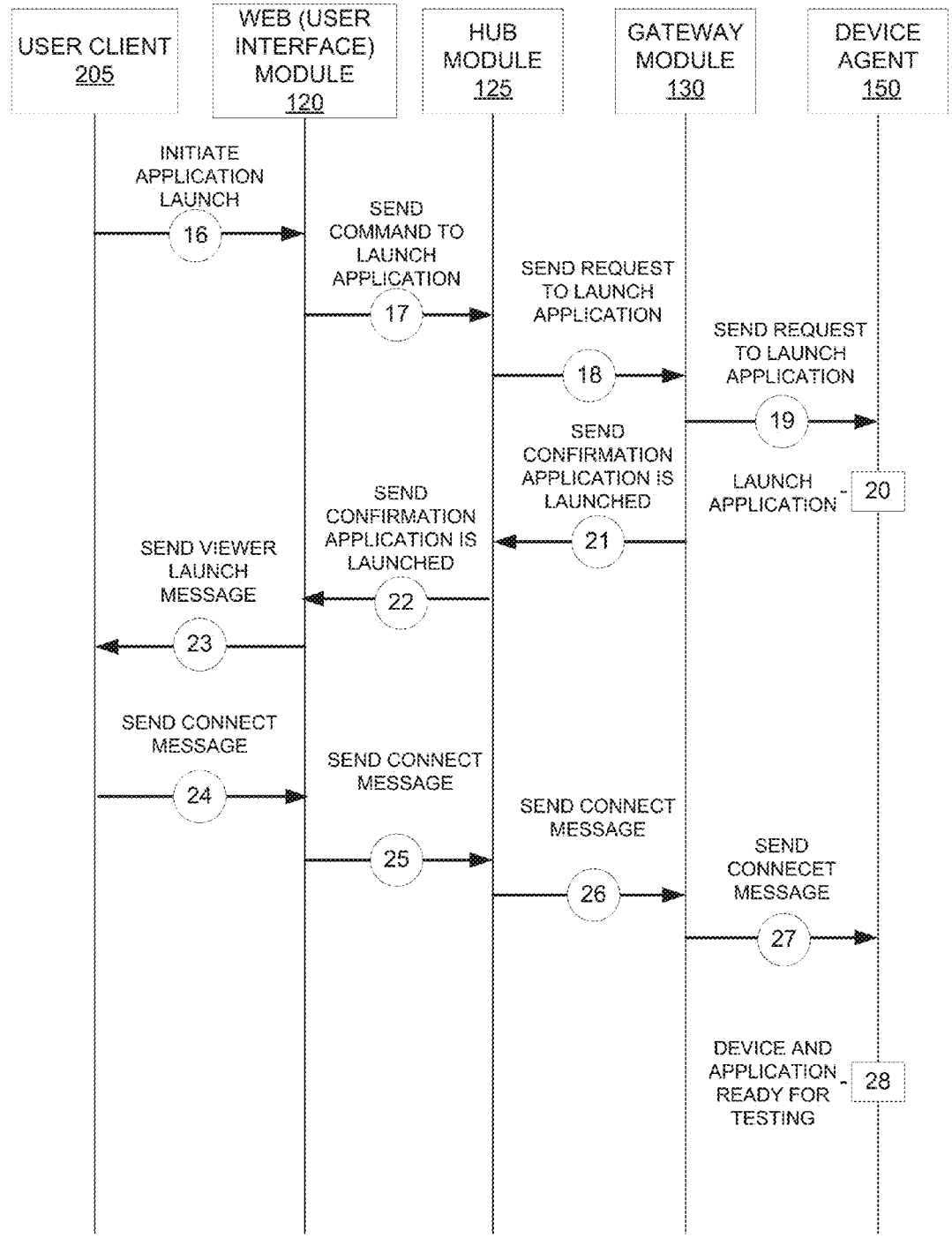
FIG. 3B – EXEMPLARY APPLICATION TESTING INITIATION PROCESS

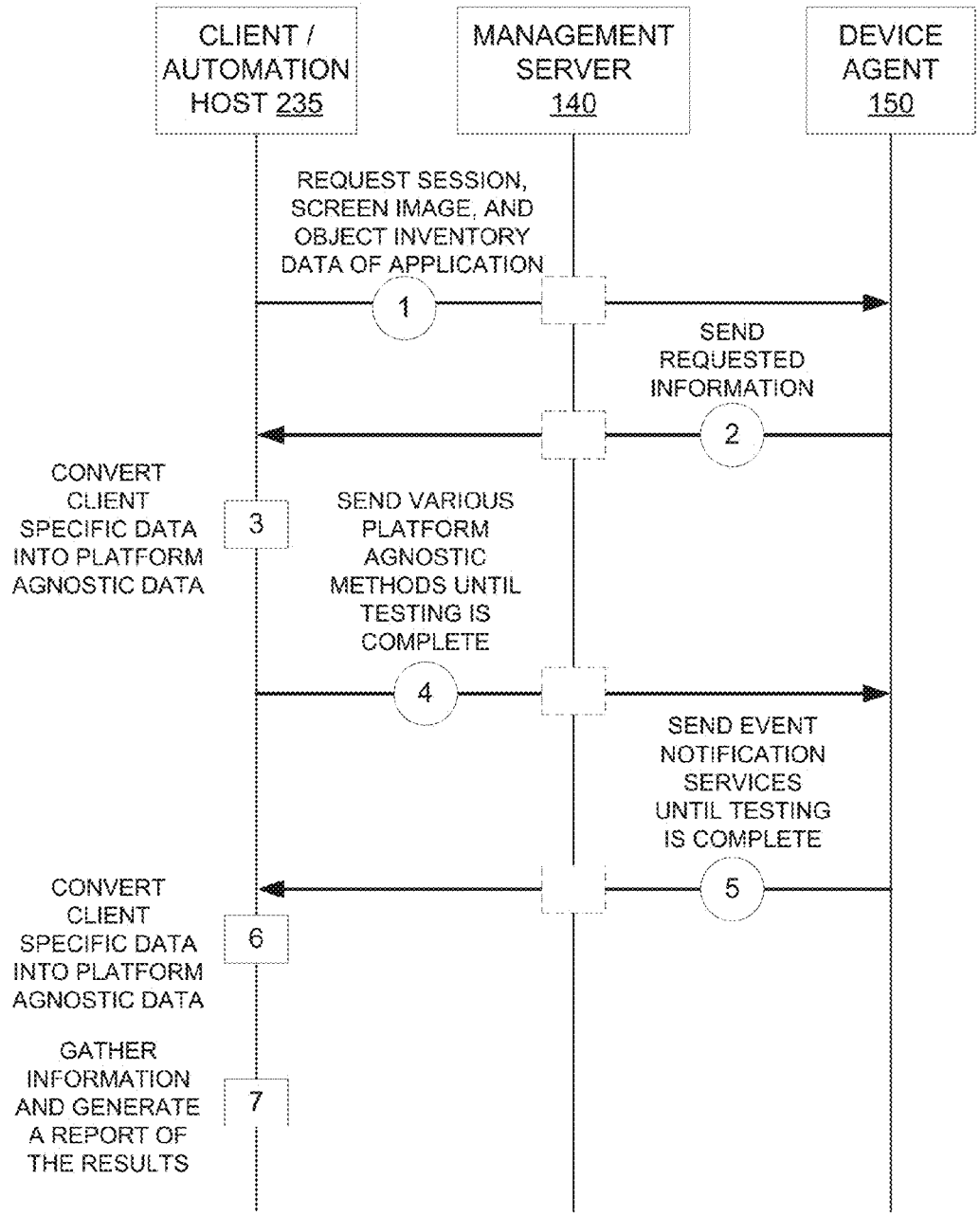
FIG. 4 – EXEMPLARY APPLICATION TESTING PROCESS

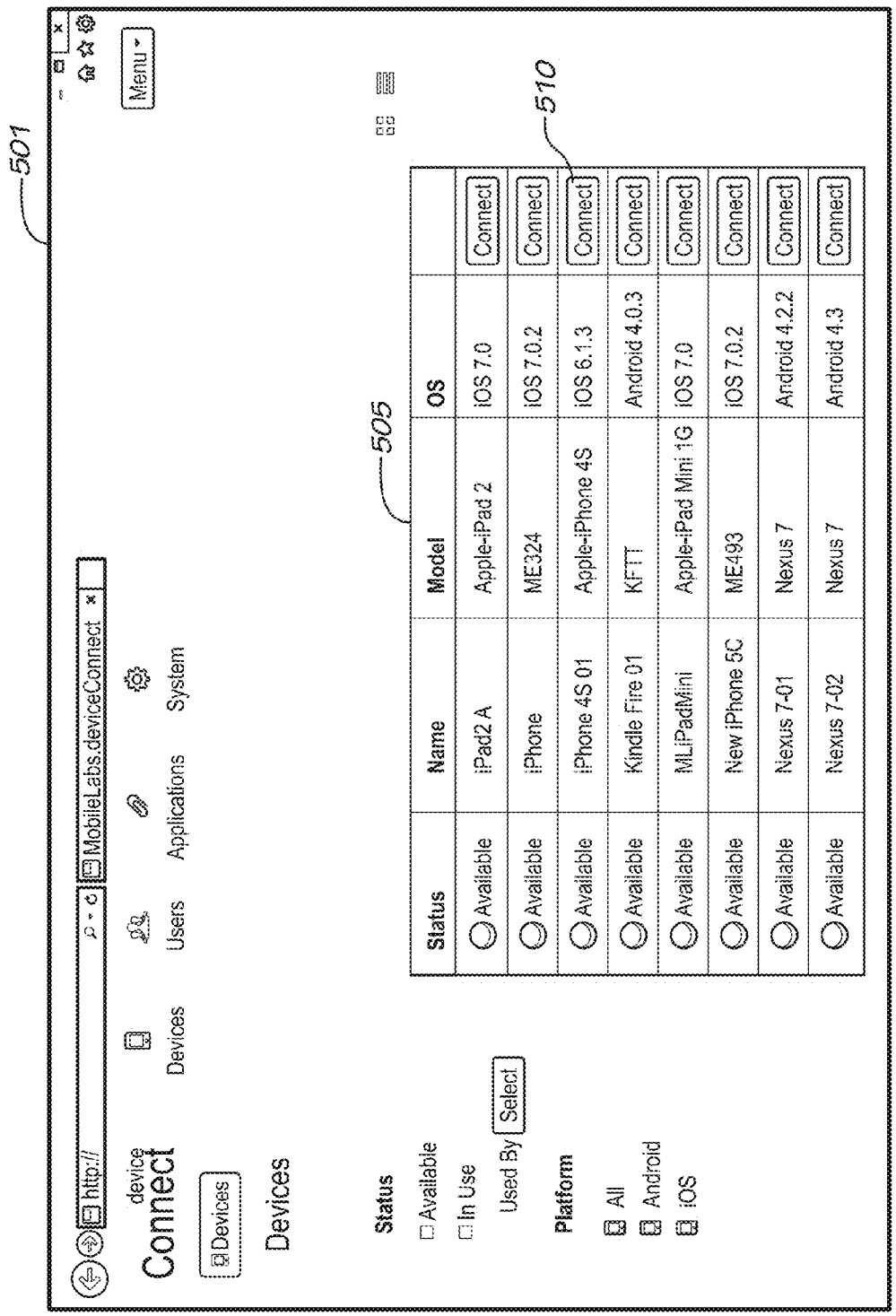
FIG. 5A - EXEMPLARY DEVICE LIST

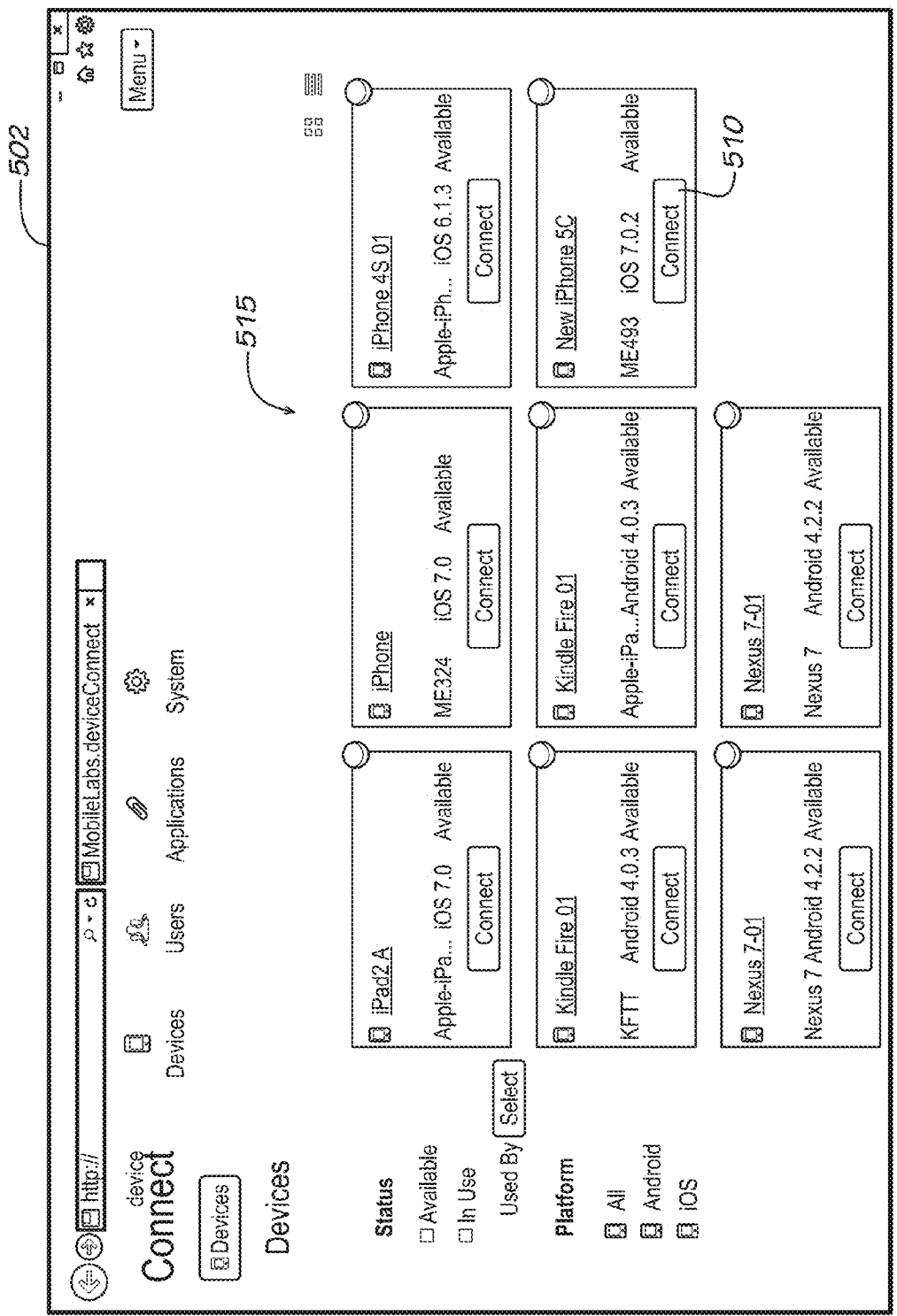
FIG. 5B - EXEMPLARY DEVICE LIST IN TILE FORMAT

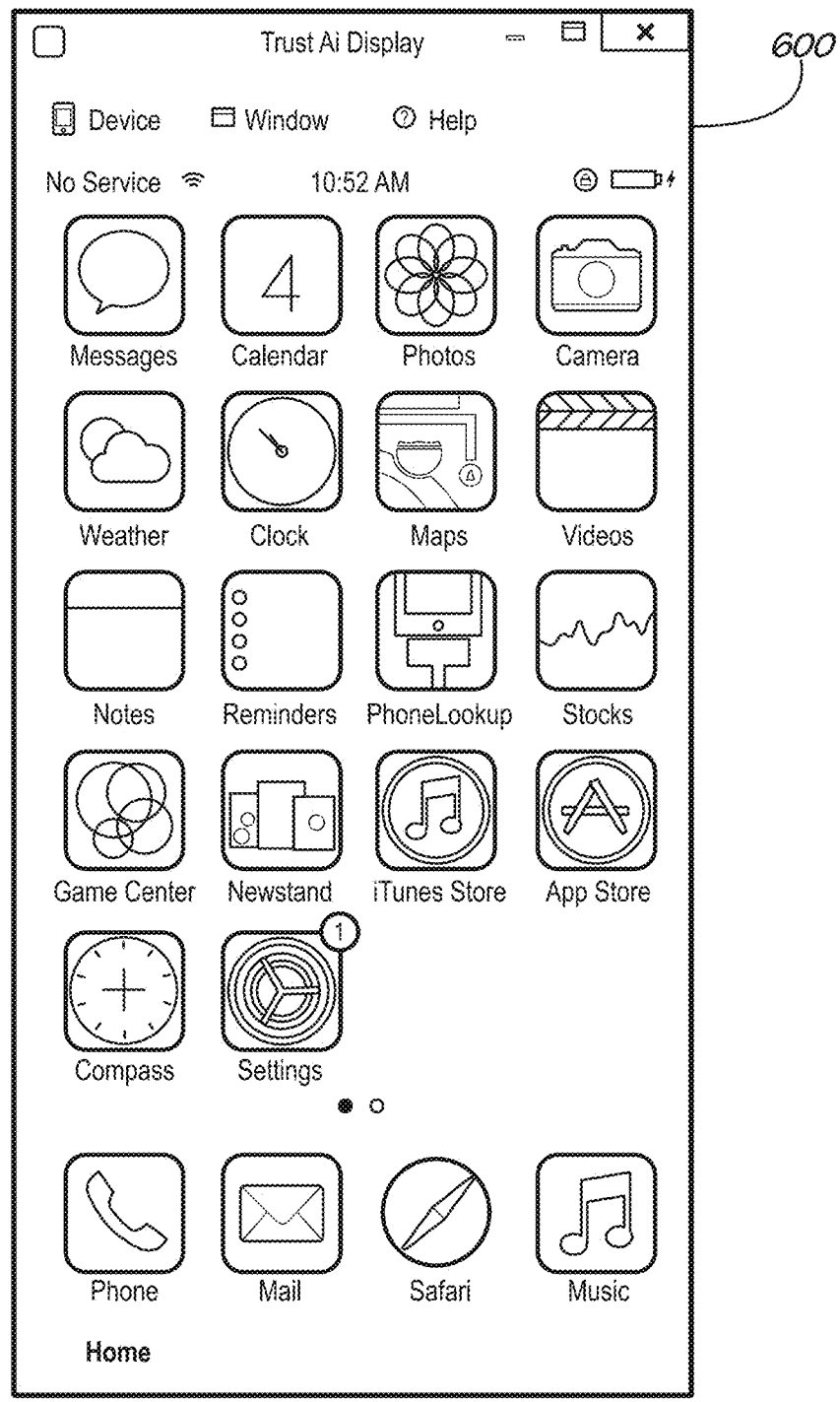
FIG. 6 - EXEMPLARY DEVICE VIEWER USER INTERFACE DISPLAY

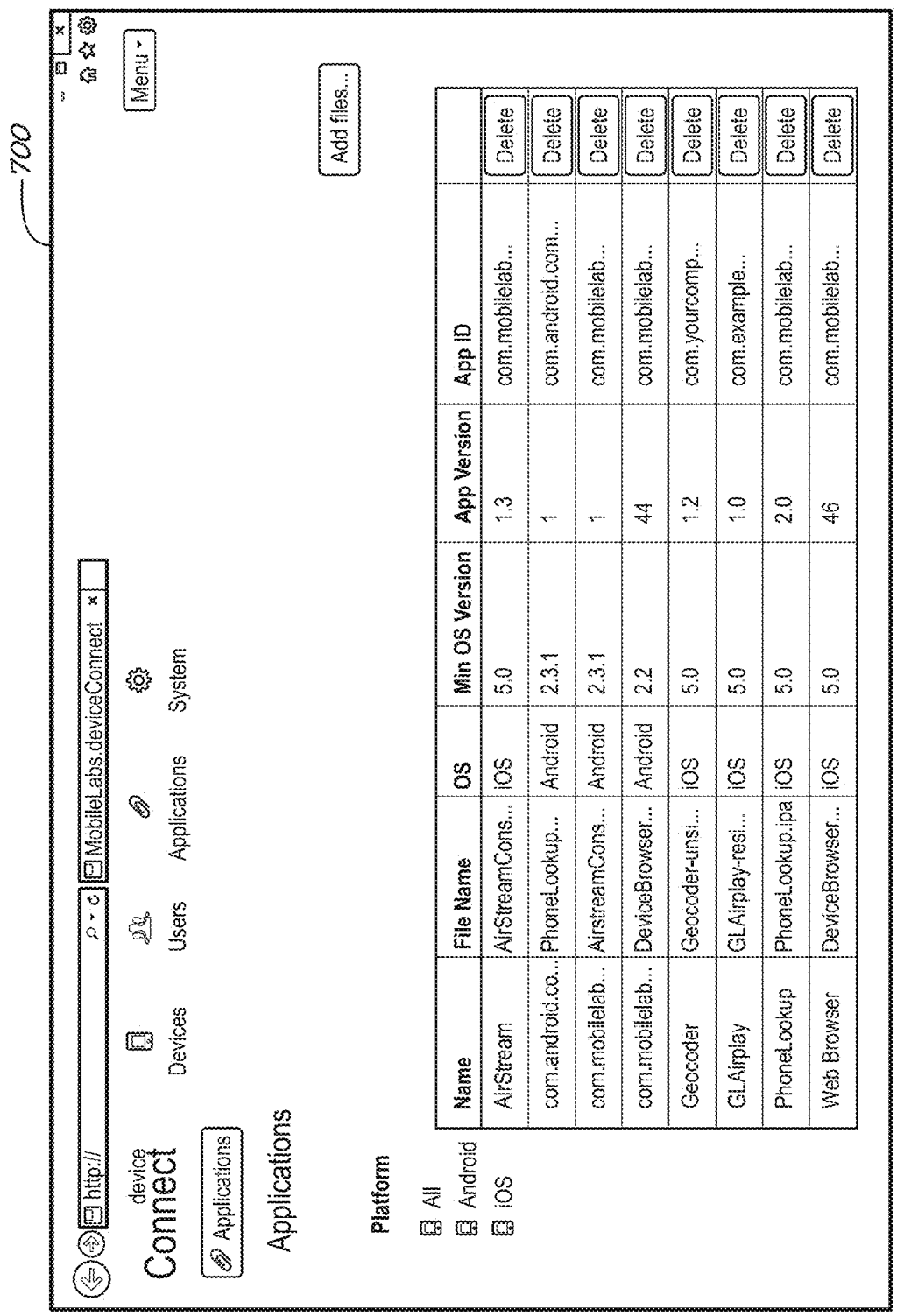
FIG. 7 - EXEMPLARY APPLICATION LIST

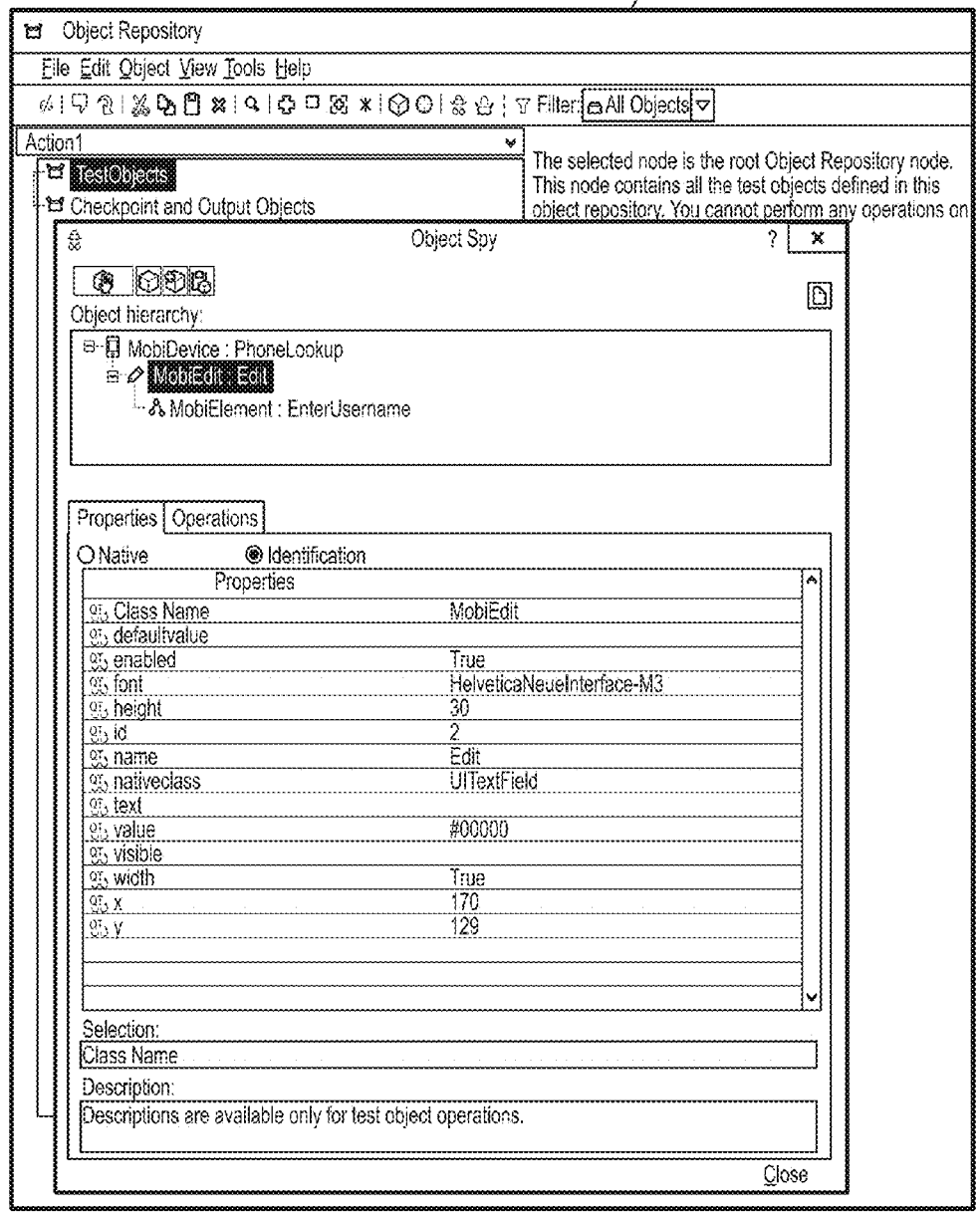
FIG. 8 - EXEMPLARY OBJECT AND OBJECT PROPERTY LIST

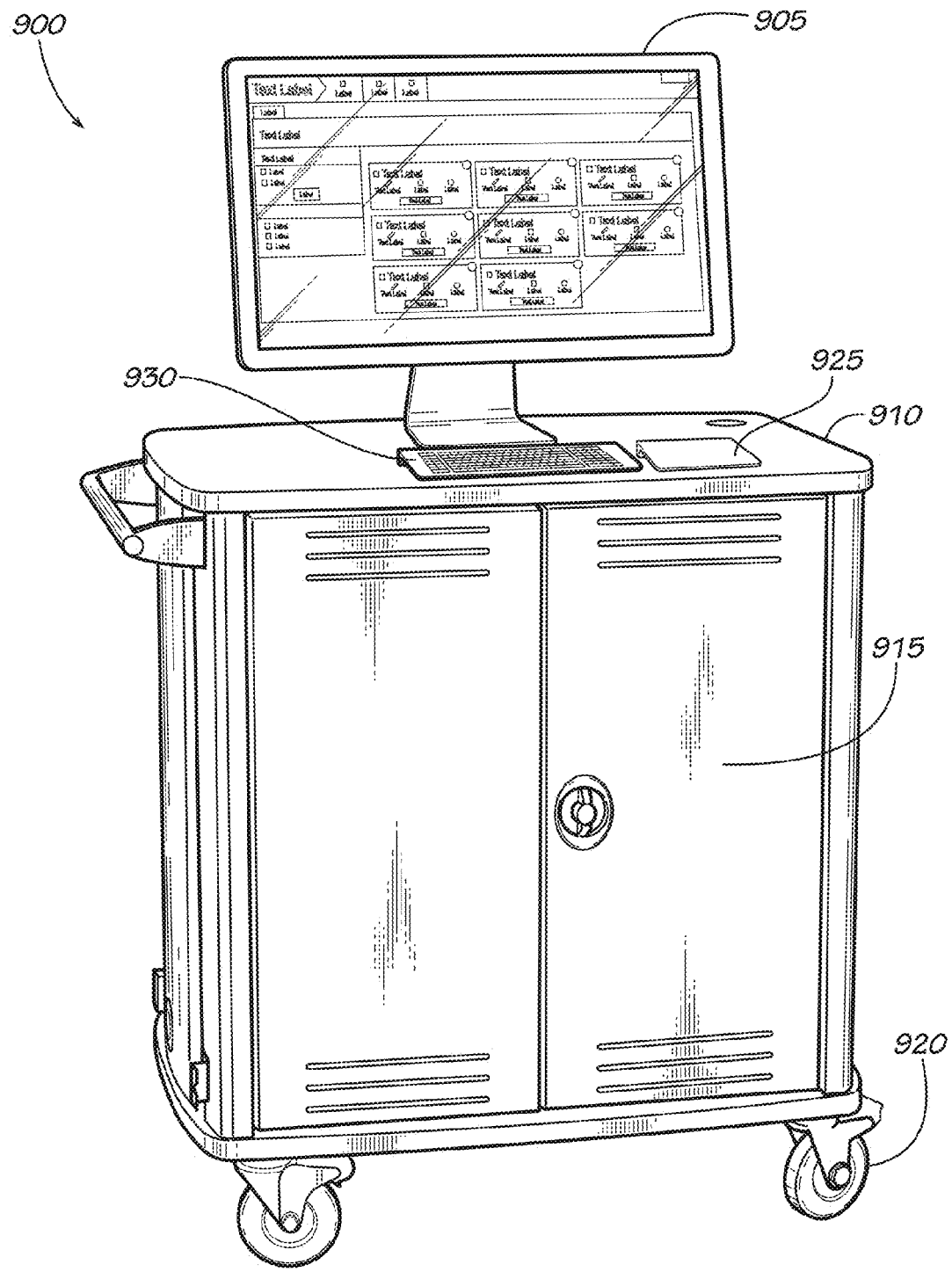
FIG. 9 - EXEMPLARY MOBILE APPLICATION TESTING SYSTEM APPARATUS

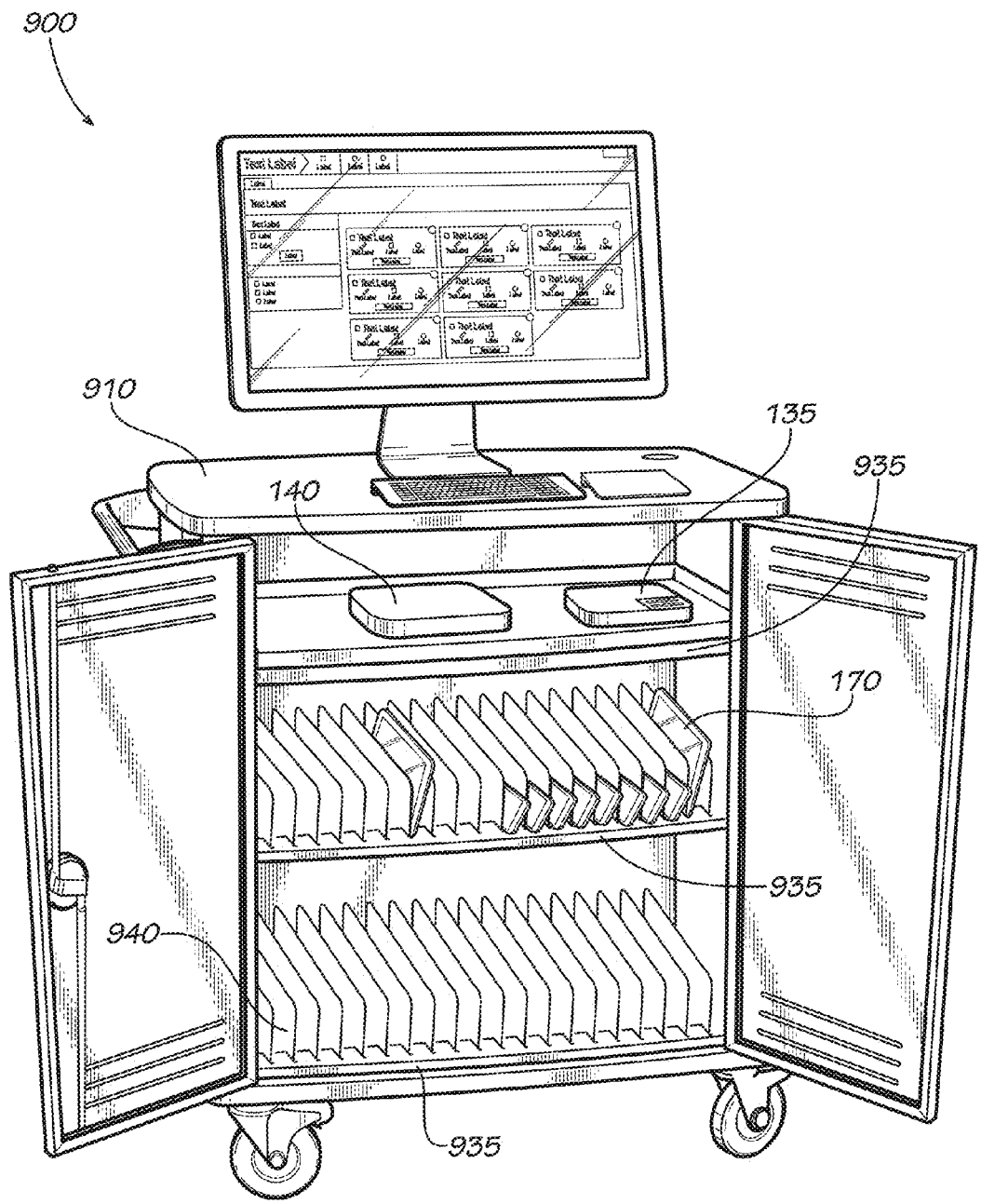
FIG. 10 - INTERIOR OF AN EXEMPLARY MOBILE APPLICATION TESTING APPARATUS

SYSTEMS, METHODS, AND APPARATUSES FOR TESTING MOBILE DEVICE APPLICATIONS

CROSS REFERENCE TO RELATED APPLICATION

This application claims benefit under 35 U.S.C. §119(e) of U.S. Provisional Patent Application No. 61/732,132, filed Nov. 30, 2012, and entitled "Systems and Methods for Remotely Testing a Plurality of Mobile Device Applications", which is incorporated herein by reference as if set forth herein in its entirety.

TECHNICAL FIELD

The present disclosure generally relates to systems and methods for testing mobile device applications, and more particularly systems and methods for simultaneously managing and testing a plurality of devices autonomously and manually via an agnostic cross-platform object model.

BACKGROUND

Advances in mobile devices and mobile device technology have increased user productivity in everyday life. These advances in mobile device technology and productivity have created a proliferation of mobile applications and software packages designed to be installed on a user's mobile device to provide a source of entertainment, easy access to certain content, or streamline common tasks associated with everyday living. Consumers who use mobile applications (also described herein as applications, app(s), and the like) have the expectation these mobile applications will be completely functional and user-friendly upon initial download and use. Therefore, application developers want to ensure, prior to the release of an application, the mobile application is tested and functions as intended.

Because the process of functional testing is typically arduous, many application development companies pay extra money to outsource functional testing to third-party application testing companies that possess the capability to perform such tests. Many third-party application testing entities facilitate application testing using various apparatuses and software designed to make testing easier. These apparatuses and solutions, however, often render various proprietary data (e.g., application source code, testing parameters, etc.) vulnerable to possible external attacks from hackers. Furthermore, providing developers user-testing authentication to further maximize security measures for proprietary information is typically not an available option for many third-party testing entities.

In addition, many of the apparatuses used for application functional testing use optical character recognition (OCR) to determine and view various embedded objects on a the device screen. However, this method is not as efficient as other object capturing methods; wherein OCR provides various object location deficiencies such as positional on-screen accuracy errors, visual errors, imprecise capture methods, etc. In particular, these deficiencies may not completely enable all objects present to be scripted for testing, which may prove to be difficult for a thorough application functionality test.

Further, most apparatus and software configurations offer limited testing capacity as many apparatuses can only support of limited number of devices for simultaneous testing, and in some cases only one device at a time. Many of the contracted third-party entities are only able to test one operating system platform (i.e., Android, iOS, Windows, etc.) at a time due to programming language and protocol constraints. Additionally, because of opposing platform constraints, some companies desire only to support testing on one solitary operating system. Further, some of the third-party testing entities have apparatuses and software that require opening or disassembling a portion of the phone to connect additional hardware (usually via soldering additional wires) to perform the testing process. Further still, most existing solutions require "jail-breaking" of the device to fully test all desired functionality.

Therefore, there is a long-felt but unresolved need for systems and methods that provide a unified application testing mechanism for testing various applications on various devices and platforms. In particular, there is a need for a system that enables application developers to seamlessly and simultaneously test a plurality of applications on a single apparatus regardless of operating system platform or the number of different tests running on the same apparatus. There is a further need for a system and method to provide an effective solution for secure application testing enabling proprietary data to remain private.

BRIEF SUMMARY OF THE DISCLOSURE

Briefly described, and according to one embodiment, aspects of the present disclosure generally relate to systems and methods for facilitating optimization of mobile application testing for mobile app developers and contracted third-party app testing entities alike. In particular and according to one embodiment, a mobile application testing system (MATS) allows simultaneous communication and charging of a plurality of devices regardless of device type and operating system. Accordingly, the MATS performs mobile testing without "jail-breaking" or removing various components of the user device. In one embodiment of the present disclosure, the MATS enables users to securely test new and/or updated mobile applications by supporting data routing behind a security firewall utilizing a transition of communications protocols. Further, and according to another aspect, various protocols provide a data tunnel allowing multiple concurrent testing sessions for multiple users via an authentication scheme. Additionally, concurrent testing sessions may include single app testing on multiple devices or a plurality of apps testing on a plurality of devices. In one embodiment, the MATS enables app testing through local on-site networks as well as remotely at off-site locations without compromising important security measures. According to yet another embodiment, a plurality of the MATS may be aggregated together to implement a horizontal scaling to create a larger collection of devices for testing.

In further embodiments, the MATS maintains a full object inventory regardless of user device platform or operating system. Accordingly, the MATS provides a platform agnostic user device testing mechanism enabling one script to communicate with devices utilizing various operating systems.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates an exemplary system environment in which an embodiment of the disclosed mobile application testing system (MATS) is utilized.

FIG. 2 illustrates an exemplary system architecture of a MATS, according to one embodiment of the present disclosure.

FIG. 3A is a sequence diagram showing a first portion of an exemplary mobile application testing initiation process, according to one embodiment of the present disclosure.

FIG. 3B is a sequence diagram showing a second portion and a continuation of FIG. 3A of an exemplary mobile application testing initiation process, according to one embodiment of the present disclosure.

FIG. 4 is a sequence diagram showing an exemplary application testing process, according to one embodiment of the present disclosure.

FIG. 5A illustrates an exemplary device inventory in list format screenshot, according to one embodiment of the present disclosure.

FIG. 5B illustrates an exemplary device inventory in tile format screenshot, according to one embodiment of the present disclosure.

FIG. 6 illustrates an exemplary client display of a device screenshot, according to one embodiment of the present disclosure.

FIG. 7 illustrates an exemplary main applications list screenshot, according to one embodiment of the present disclosure.

FIG. 8 illustrates an exemplary object listing and the object properties screenshot, according to one embodiment of the present disclosure.

FIG. 9 illustrates a perspective view of an exemplary MATS apparatus, according to one exemplary embodiment of the present disclosure.

FIG. 10 illustrates a perspective view of an exemplary MATS apparatus and the contents within the MATS apparatus, according to one exemplary embodiment of the present disclosure.

DETAILED DESCRIPTION

Prior to a detailed description of the disclosure, the following definitions are provided as an aid to understanding the subject matter and terminology of aspects of the present systems and methods, are exemplary, and not necessarily limiting of the aspects of the systems and methods, which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to systems and methods for facilitating optimization of mobile application testing for mobile app developers and contracted third-party app testing entities alike. In particular and according to one embodiment, a mobile application testing system (MATS) allows simultaneous communication and charging of a plurality of devices regardless of device type and operating system. Accordingly, the MATS performs mobile testing without "jail-breaking" or removing various components of the user device. In one embodiment of the present disclosure, the MATS enables users to securely test new and/or updated mobile applications by supporting data routing behind a security firewall utilizing a transition of communications protocols. Further, and according to another aspect, various protocols provide a data tunnel allowing multiple concurrent testing sessions for multiple users via an authentication scheme. Additionally, concurrent testing sessions may include single app testing on multiple devices or a plurality of apps testing on a plurality of devices. In one embodiment, the MATS enables app testing through local on-site networks as well as remotely at off-site locations without compromising important security measures. According to yet another embodiment, a plurality of the MATS may be aggregated together to implement a horizontal scaling to create a larger collection of devices for testing.

In further embodiments, the MATS maintains a full object inventory regardless of user device platform or operating system. Accordingly, the MATS provides a platform agnostic user device testing mechanism enabling one script to communicate with devices utilizing various operating systems.

Exemplary Embodiment

Referring now to the figures, FIG. 1 illustrates an overview 100 of an embodiment of a Mobile Application Testing System (MATS) 101 in an exemplary environment, constructed and operated in accordance with various aspects of the present disclosure. As previously noted, according to one aspect, a MATS 101 is generally used to facilitate optimization of mobile app testing for app developers and those companies who provide a mechanism for app developers to test mobile applications. As will be understood, a mobile application (app) generally comprises a software package, which is installed on a user device or other computing device, to increase productivity, provide entertainment, and offer users ease of access to various content (e.g., Candy Crush, eBay mobile app, Facebook, etc.). Because various mobile operating platforms utilize and recognize different programming languages and syntax, mobile applications are typically constructed independently and specifically for various operation systems (e.g., iOS, Android, Windows Mobile, etc.).

As shown in FIG. 1, the MATS 101 comprises a management server 140 comprising a web user-interface module 120, a hub (coordination) module 125, and a gateway (multiplexor) module 130 for managing the process of mobile application testing as directed by a user 105 on various devices 170 (also may be referred to herein as user devices, user devices, or managed mobile devices). A module generally comprises a computer/software implementation on a device that performs a particular function. As will be understood by one of ordinary skill in the art, various devices may comprise different operating system platforms (e.g., Android, iOS, Windows Mobile, etc.). According to one embodiment and shown in FIG. 1, the MATS comprises a web (UI) module 120 for providing a mechanism for the MATS 101 to interface with a user 105 and a plurality of devices 170. In one embodiment, the web (UI) module 120 can launch and terminate applications, access metadata, maintain access controls, etc. Further, in one embodiment, the web (UI) module generally performs functions prior to connecting to the device comprising user authentication and routing connection parameters to the device 170. In one embodiment, a user 105 generally may comprise a system administrator 110, an app developer, a third-party testing entity employee, and the like.

In one embodiment illustrated in FIG. 1, the MATS 101 includes a hub (coordination) module 125 for directing data traffic, data requests, and information exchanges to the various components within in the mobile application testing system environment 100. Further, the hub module 125 manages databases 175, serves as the module to perform many MATS functionalities on the device side, as well as comprises the mechanism by which clients utilize to access devices 170. Embodiments of the MATS 101 further comprises a gateway (multiplexor) module 130 for routing data between the management server 140 and a one or more USB hubs (e.g., 135a, 135b, and 135c). Additionally, the gateway module 130 performs a transition of Ethernet (TCP/IP) to USB protocol enabling a creation of a data tunnel. Further embodiments of the MATS 101 include USB hubs, such as USB hub A 135a, USB hub B 135b, and USB hub C 135c that route data from the management server 140 to and from the particular devices 170 being tested. According to one aspect, the USB hub 135 utilizes a wired connection from the hub module 125 through the USB hub to the devices 170. By utilizing a wired connection, the application testing can transmit more data, faster than conducting the testing over Wi-Fi. Further and in one aspect, the wired connection also provides additional security measures because a user 105 must authenticate (an authentication mechanism will be discussed further in connection with FIG. 2) to access the hub module 125, therefore, the application testing is conducted through the hub module and the connected devices 170. (Architectural details showing various software modules, clients, and associated components comprising an embodiment of the MATS 101 will be discussed in greater detail in connection with FIG. 2).

As shown in FIG. 1, the MATS 101 is in operative communication with various users 105 and various devices 170. As further shown in FIG. 1, the MATS 101 includes operative connections from various users 105 and administrator 110, wherein system accessibility and user level is determined according to the discretion of the entities utilizing the system. Typically, such operative connections involve a secure connection or communications protocol, and communications over a network 165 typically involve the use of one or more services such as a web-deployed service with client/server architecture. In one embodiment, the MATS 101 comprises additional security mechanisms for securely communicating and transmitting data behind a firewall.

The FIG. 1 embodiment of the MATS 101 also shows a representative device agent 150 (which may be referred to in priority disclosures as the cayenne agent or testing agent and is incorporated herein by reference) residing on a user device 170 for facilitating various aspects of mobile app testing. In one embodiment, the device agent comprises a software program installed on each user device 170 and controlled by the MATS 101 for communicating various functions with the device and receiving information from the device. For example, in one embodiment, the library 155 generally comprises an application-based module that facilitates testing and communication on a device 170. In one embodiment, the external operations 160 comprises a separate background service that provides system-level control of the device (e.g., screen capture system input, activating a button, accessing various user device functions, etc.).

As shown in FIG. 1 and according to one embodiment, a plurality of users 105 are engaging the MATS 101 via a network 165 to conduct mobile application testing. As will be understood by one of ordinary skill in the art, a user may engage the MATS 101 remotely via a user machine 107 as shown in FIG. 1 or locally at the management server 140. In one embodiment, the MATS 101 may comprise a complete all-in-one station (as described in greater detail in connection with FIG. 9) with a plurality of interfacing components at the MATS 101. Exemplary testing commands are transmitted via the network 165 to various components within the management server 140. According to one aspect, the testing commands may comprise test scripts, screen capture requests, requests for object inventories, etc. In one aspect, test information data may be stored in the database 175, wherein the database is accessed to retrieve various data during the execution of the mobile application test. Test information data stored in the database 175 may comprise applications for testing, diagnostic information, usage data, device inventory data, etc. The information transmitted to the management server 140 is interpreted by the management server and routed via a USB hub 135 to the appropriate device(s) 170 for execution.

The discussions above in association with FIG. 1 are merely intended to provide an overview of an embodiment of the present systems and methods for facilitating optimization of mobile application testing, and for providing a platform agnostic mechanism for testing mobile applications with one unitary script. Accordingly, it will be understood that the descriptions in this disclosure are not intended to limit in any way the scope or the spirit of the present disclosure. Various architectural details of an embodiment of the disclosed MATS will be described next in greater detail.

FIG. 2 illustrates an exemplary system architecture 200 of a MATS 101 according to one embodiment of the present disclosure. According to one aspect, a MATS 101 may be hosted on a local physical server, a third-party server, a cloud server, or a virtual server centrally hosted in the cloud. According to one embodiment (and as will be discussed further), the MATS 101 generally comprises a collection of servers, databases, gateways, hubs, and software modules comprising processes, subroutines, or various algorithms operated by an embodiment of the MATS 101. As previously described and according to one embodiment, some aspects of the MATS architecture 200, in particular the user client 205 may be on a remote user machine 107 detached from the MATS 101. In yet another embodiment, the user client 205 may be local and embedded in the MATS 101.

As shown and discussed previously, a MATS 101 generally comprises a management server 140 for managing the coordination of mobile application testing functions by the MATS 101. In one embodiment, the management server 140 generally comprises a USB server (e.g., Mac mini, plug PC, server tower, server rack, etc.) for managing and coordinating various aspects of the MATS 101. According to one aspect of the present embodiment, a management server generally supports up to 16 devices per server. As will be understood by one of ordinary skill in the art, the aforementioned example server and server capacity are merely for exemplary purposes and is not intended to limit the scope or spirit of the present disclosure. Additionally and according to one embodiment, multiple management servers 140 may be aggregated together to create a horizontal scaling of devices 170. For example, to create a larger network of devices 170 to accommodate mobile app testing on more than 16 devices simultaneously, the management server 140 of many MATS 101 may be connected to create a larger network of devices 170 for application testing. Further, the devices may be disaggregated into separate groups or communities to further optimize mobile application testing, according to one embodiment of the present disclosure. In particular, a plurality of devices 170 may be disaggregated according to testing entity, applications to be tested, various teams, etc.

The MATS architecture 200 further comprises a user client 205 for controlling and engaging various aspects of mobile application testing, as shown in the FIG. 2 embodiment. In one embodiment, the user client 205 (via the web (UI) module 120) provides additional security measures for MATS 101 by providing a log in authentication mechanism ensuring only registered users 105 have access to mobile app testing components. Further, according to one aspect, the authentication scheme may also dictate the level of access and which devices may be obtained depending on authorization level set by an administrator 110. In one embodiment, the user client 205 via the web (UI) module 120 displays an inventory of devices 170 available for mobile application testing (device inventories are described in greater detail in connection with FIGS. 5A and 5B) and also recognizes when a device 170 is plugged into the MATS 101. Additionally, the user client 205 enables device selection according to mobile app testing desires. According to one aspect of the present embodiment, devices 170 may be selected by device type, device name, operating system type, etc. Further in one embodiment, the user client 205 displays the current user interface display of the connected device 170. Generally, but not necessarily, one device 170 is connected and shown on the device viewer 220 at any given time.

Further, in connection with the device viewer 220 and according to one embodiment, the device viewer generally serves as the interface between the user client 205 and the user device 170. Accordingly, the web (UI) module 120 generally starts the device viewer 220 after a connection request is sent to the device 170. In one embodiment, the device viewer 220 exposes a standard set of application programming interfaces (APIs) (via the client library 227) for use by the automation host 235. The client library 227 supports these APIs, and encapsulates all interaction with the user device 170. According to one aspect, the client library 227 enables the conversion of platform specific data into platform agnostic data that can be understood by the functional test module 210 and the device agent 150.

In certain embodiments, the device viewer 220 displays the user interface on the user machine 107 for the current application being tested on a local or remote user device 170. Accordingly, the device viewer 220 displays the user interface to ensure the application is functioning correctly. Further, the user interface displayed on the device viewer 220 can be utilized during manual testing or to create test scripts by visually identifying objects within the user interface in order to appropriately choose the targeted objects required for a particular test. According to one aspect, objects generally comprise a button object, a check box object, a device object, etc. The user interface of the device viewer 220 on a user machine 107 may also initiate a request for an object inventory, initiate click events, initiate a screen capture, etc. Further, the device viewer 220 continuously receives screen feeds from the device agent 150 and automatically refreshes the user interface.

According to one embodiment of the present disclosure, the MATS 101 may test the target application 255 manually utilizing the device viewer 220. The device viewer 220 and an object spy module 230 collaborate with the trust add-in 215 to identify various objects embedded within the user device 170 by placing the mouse over various locations of the user-interface that is displayed on the device viewer 220. In one aspect, by utilizing the mouse and interacting with the user-interface within the device viewer 220, objects may be identified and therefore used to execute various test commands.

In one embodiment, the automation host 235 communicates via the client library 227 to send various application testing commands to the device 170. According to one embodiment, the automation host 235 is a separate process that essentially maintains the current state of the target application 255 (i.e., the application being tested) on the device 170 and translates the client specific scripts into an agnostic language or objects recognizable by the functional test module 210. In another embodiment, the automation host 235 translates agnostic language or commands to platform language that can be understood by the various devices 170. As will be generally understood, objects generally comprises various representations of on-screen features, embedded user device features, and embedded user device functions.

In one aspect, the automation host 235 requests an object inventory from the device agent 150. In another aspect, the automation host 235 utilizes the "gateway API" embedded in the client library 227 to pass requests, commands (or method calls), and test script information to the hub module 125 commencing the path propagation of information to the managed mobile device 170. In one aspect, a method call is a testing command that may be executed on an object, such as activate, button press, click, double click, etc. In one aspect, the client library 227 in collaboration with the automation host 235 removes the layers of various platform specific object data to identify specific attributes common to various platforms and merges the objects to form a platform agnostic object.

According to another aspect, the automation host 235 works with the trust add-in 215, and the device viewer 220 to define a mapping for each platform that is supported (e.g., Blackberry, iOS, Android, etc.) between that platform's native objects and the generic platform models by placing the mouse pointer over a viewable object on the device viewer 220. For example, the automation host 235 can identify the native structure of objects such as an iOS home button and an android home button, and the platform agnostic object model will refer to both under a merged "home button" object. Further, according to another aspect, the automation host 235 is responsible for generating the requested user-interface in the device viewer 220 for the appropriate mobile device 170.

As shown in FIG. 2 and according to one embodiment, the user client 205 further comprises a functional test module 210 that functions as the overarching testing module with which mobile application testing is conducted. In one embodiment, the functional test module 210 executes test scripts specifically designed for the target application 255 that is to be tested. According to one aspect, the functional test module comprises a script client 223 containing and executing the test scripts to test the target application 255. In one embodiment, a test script comprises the method calls or subroutines interacting with objects, which have been predefined, that executes commands directed towards the target application 255. According to one aspect, the test script may utilize the visually identified objects within the target application 255 and may correlate inventory objects with visual objects utilizing the object repository 225, object spy 230 (both components will be discussed in detail below), and the trust add-in 215. In another aspect, the functional test module 210 supports automated interaction. For example, the MATS 101 may support autonomous app testing via a test script wherein the test script contains all sub-routines, commands, and instructions to functionally test the app. According to one aspect, the test script is executed by the functional test module 210, wherein the functional test module 210 engages the trust add-in 215 and the automation host 235 to deliver platform-specific method calls and subroutines to the mobile device 170. In one embodiment, the functional test module 210 may comprise a third-party testing software, such as HP Quick Test Pro (QTP) or HP Unified Functional Testing (UFT). In another embodiment, the functional test module 210 may comprise a proprietary testing software that enables autonomous testing via test scripts.

In one embodiment shown in the MATS architecture 200, the trust add-in 215 is a plug-in interface that is integrated with the functional test module 210 for facilitating and coordinating mobile application testing with various components within the user client 205. According to one aspect, the trust add-in 215 can talk to mobile devices 170 through the authentication scheme of the web (UI) module 120 and subsequently the device viewer 220. Further, the trust add-in 215 provides an option for autonomous interaction. In one aspect, the trust add-in 215 can operatively communicate with the device agent 150 embedded on the mobile device 170 to direct commands and send requests (e.g., request a screen capture, request input events, request descriptions of all of the objects in the application, etc.). As will be generally understood, an event typically comprises an operation or occurrence on a mobile device 170. This event may be in response to a method call embedded in a test script, an executed command, or some like action on the device 170. In one aspect, the trust add-in 215 defines various aspects associated with objects such as properties, subroutines, etc.

According to one aspect, the trust add-in 215 creates a platform agnostic view of the structure of the target application's user-interface; in particular, the trust add-in utilizes the identified objects within the target application 255 and creates a common application or interface object model. Further, the trust add-in 215 engages an object inventory (object inventory will be discussed further in connection with the object repository 225) and sends scripted control inputs. According to another aspect, the trust add-in 215 uses the object inventory as a reference for generating events and for validating application state at various checkpoints within the script client 223.

As further shown in the FIG. 2 embodiment and as previously discussed, the functional test module 210 of the MATS 101 further comprises an object spy module 230. In one aspect, the object spy module 230 works with the trust add-in 215 to provide a correlation of identified objects within the target application 255 and objects within the object repository 225 or objects within the script client 223. According to one aspect, the object spy module 230 can obtain from the trust add-in 215 descriptions, attributes, and properties of objects within a target application 255 via a cross-platform view of the user-interface displayed in the device viewer 220. Further, test scripts may be constructed utilizing the information obtained via the object spy module 230. According to one aspect, object properties may comprise object location, object definition, font, color, width, height, etc. For example, as the mouse pointer is placed over an object, the trust add-in 215 informs the object spy module 230 what the object and the object properties of the object are, while the device viewer 220 communicates location information to the object spy module 230.

Still referring to FIG. 2, in one embodiment the functional test module 210 further comprises an object repository 225. In one aspect, the object repository 225 comprises a plurality of object models and object paths, wherein object models are determined by identifying platform equivalent objects, and defining a platform agnostic object representing the platform equivalent objects. Further and according to one aspect, for each object type with which an object model has been created, a set of subroutines and property definitions generally are assigned to said object model. Therefore, the object repository 225 by querying the trust add-in 215 provides the MATS 101 known resources regarding capabilities for certain identified and defined objects; in particular, what types of properties and subroutines said objects may comprise. In one embodiment, the object inventory produced by the device agent 150 (details in connection with the device agent 150 will be discussed in greater detail below) provides information to construct object paths within the object repository 225. According to one aspect, each object path describes a containment relation beginning with the root device and continuing to a specific user-interface control object. According to another aspect, the root element of any given object path generally comprises properties to inform the automation host 235 during selection of an appropriate viewer for interaction with the user-interface object in the trailing element of the object path.

The MATS system architecture 200 further comprises a hub module 125 for delegating functions as the intermediary mechanism between the user client 205 and the device agent 150, according to one aspect of the present disclosure. In one aspect, the hub module 125 further serves as the mechanism to execute administrative functions as requested by the user client 205 and the web (UI) module 120. In one aspect, the hub module 125 utilizes the gateway library 240 to access the appropriate device through the device gateway 130. Further, the hub module 125 can test mobile applications on many devices 170 simultaneously utilizing a plurality of different applications dispersed throughout the mobile devices. In one aspect, the hub module 125 performs a web-based retaining of devices, wherein retaining makes a device available for exclusive use by an authorized user. According to another aspect, the hub module 125 (via the web (UI) module) is responsible for user 105 access controls for the MATS 101. In yet another aspect, the hub module 125 exposes functions for configuring devices 170 in a universal manner. Further, according to another aspect, the hub module 125 executes a request for a plurality of function commands, such as obtaining screenshots, object inventories, sending commands between the user client 205 and the mobile device 170, creating and managing devices, gateways, user groups, etc. In yet another aspect, the hub module 125 enables multiple concurrent sessions for multiple users 105 utilizing the authentication scheme of the device viewer 220.

In one embodiment, the hub module 125 further comprises a service library 270 for interacting with various data within the database 175. In one aspect, the database 175 functions as a repository for data inclusive to the MATS 101. According to one aspect, the service library 270 utilizes object-relational mapping (ORM) technology for communicating with the database 175. Accordingly, the service library may communicate with various database software packages (e.g., MSSQL, MySQL, SyBase, Oracle 8i, etc.) enabling multi-platform and software compatibility within various embodiments of the MATS 101. As will be generally understood by one of ordinary skill in the art, the aforementioned database 175 and service library 270 packages are stated for exemplary purposes only and any similar package may be used. Further, the aforementioned packages are not intended to limit the spirit or the scope of the present disclosure.

As further shown in FIG. 2, in one embodiment, the MATS architecture 200 comprises a device gateway 130 for engaging with a USB hub 135 and the hub module 125. In one aspect, the device gateway 130 functions as a proxy between the hub module 125 and the mobile device 170. In one aspect, the device gateway 130 generally comprises a multiplexing mechanism enabling the user client 205 to communicate with a plurality of devices and route data to the appropriate USB hub 135. In one aspect, the device gateway 130 processes many simultaneous information and data requests using multiple domain sockets. According to one aspect, utilizing the device gateway 130 as a multiplexor, the client may initiate a mobile application test on one device 170 or a plurality of devices. According to another aspect, the device gateway 130 enables testing of one target application 255 or multiple target applications simultaneously.

In one embodiment in connection with the multiplexing of the device gateway 130, transitioning from Ethernet protocol to USB protocol and USB protocol to Ethernet protocol utilizing the device gateway 130 enables the MATS 101 to employ the various adverse communications protocols associated with the various operating systems concurrently via the gateway library 240. According to one embodiment, the device gateway engages the multiplexor connection on multiple sockets; one socket is utilized to discover devices and another is utilized for each data connection to a device 170. In one aspect, the device gateway 130 utilizes an Apple usbmux server to communicate with iOS devices and the Android ADB is used to communicate with Android devices. As will be generally understood by one of ordinary skill of the art, the aforementioned mechanisms for communicating with the plurality of devices are for exemplary purposes only and are not intended to limit the scope or spirit of the present disclosure.

According to one embodiment, the device gateway 130 (via the transition between protocols) creates a data tunnel enabling the MATS 101 to communicate generically with a plurality of mobile devices 170. According to one aspect, utilizing a plurality of protocol transitioning mechanisms, the device gateway 130 maintains constant communication and simultaneously interleaves the data traffic of multiple platforms. In one aspect, the data tunnel connection utilizes the gateway library, which enables the user client 205 to access the device agent 150 embedded on a mobile device 170. According to one aspect, the data tunnel utilizes an asynchronous remote procedure call (RPC) protocol that comprises sequential numbering of messages and maintenance of tracking information, such as connection identifiers, endpoint addresses, validation routines, and procedures for automatically terminating connections at the end of a testing session or in the event of an error, returning the device to an accessible state. Further, and according to another aspect, the device gateway 130 utilizes a priority queue to ensure that the asynchronous data is sent to the device 170 in the right order.

As shown in FIG. 2 and according to one embodiment, the MATS architecture 200 further comprises a device agent 150 as an agent resident on managed mobile devices 170. As previously described and in one aspect, the device agent 150 functions as the communicating mechanism between the user client 205 and the managed mobile device 170 for receiving and sending various communications within the MATS 101.

In one aspect, the agent is a platform agnostic UNIX concept comprising a dynamic library 155 that is deployable to a plurality of devices. According to one aspect, the device agent 150 supports manual application testing and autonomous application testing using a test script.

In one embodiment, the device agent 150 places events into the managed mobile device 170 platform dispatch queue to be processed by the target application 255 as received from the user client 205. In one aspect, the device agent 150 is responsible for platform specific requirements. According to one aspect, the device agent 150 may directly invoke a state change and other method calls on objects as directed by the user client 205. In one aspect, the device agent handles platform specific aspects of an object method invocation, such as instantiating appropriate arguments and knowledge of the correct series of operations to produce the effect described by the abstract method call as requested by the user client 205. In yet another aspect, the device agent 150 talks to both native apps and a provided web browser extending the cross-platform notion to iOS, Android, and web content.

In one embodiment, the device agent 150 performs various functions as directed by the user client 205. In one aspect, the device agent 150 comprises an object inventory discovery mechanism that searches the target application 255 to build a tree of all reachable user interface components and their containment relationships. As previously discussed, the user client 205 generally requests an object inventory from the device agent 150. According to one aspect, the device agent 150 sends a raw data, platform specific object inventory back to the user client, wherein (as previously described), the automation host 235 and the client library 227 remove various intermediate "containers" and platform specific information during the conversion to platform agnostic data. According to another aspect, the object inventory captured by device agent 150 is a full object inventory of all objects loaded by the target application 255. Additionally, along with the full object inventory, the device agent 150 produces lists of all properties associated with all identified objects. Further, in one aspect, the device agent 150 creates a z ordering of objects, wherein a z ordering of objects refers to determining which objects are layered on top of other objects. Z ordering of objects is generally important because it enables the device agent 150 to identify two objects that occupy the same physical space on the display. By identifying two objects that are occupying the same space, the device agent 150 is able to determine which of the two objects receives the user input.

In one embodiment, the device agent 150 further communicates operations within the target application 255 back to the user client 205. In one aspect, the device agent 150 sends notifications back to the user client 205 of the events that occur on the managed mobile device 170. In another aspect, the device agent 150 intersects operations (e.g., push of a button, accessing an accelerometer, etc.) in such a way that it provides the user client 205 with a notification and it is displayed on the device viewer 220. Accordingly, when a user 105 initiates an operation, the screen (user interface) of the device viewer updates 220 such that the user 105 may verify accurate operation. Further, the user client 205 records event changes and operations sent by the device agent 150, wherein the functional test module 210 generates a report detailing the results of the mobile application test. According to another aspect, the device agent 150 continuously transmits screen feeds and screen data back to the user client 205.

FIGS. 3A and 3B illustrate an exemplary application testing initiation process, wherein FIG. 3A illustrates the first portion of the process and FIG. 3B illustrates the second portion of the process according to one embodiment of the MATS 101. Referring now to FIG. 3A, the application testing initiation process generally involves the user client 205, the web (user interface) module 120, the hub module 125, the gateway module 130, and one or more mobile devices 170. Accordingly, in one embodiment, the exemplary application testing process generally commences at process 1 with the user client 205 requesting a device list, which is shown on the web (user interface) module 120 as seen in process 2. In certain embodiments, the devices may be displayed on the web module 120 in at least two different modes: in a list style (see FIG. 5A) or in an arranged tile style (see FIG. 5B). The device list shows various devices 170 available for testing mobile applications. Once the desired device or devices are identified, the web module sends a request to retain the device(s) and the hub module retains the appropriate device for exclusive testing of the mobile application. Alternatively, according to one aspect, a device 170 may be requested for retaining by device id, device type, operating system type, etc. As previously described, retaining a device 170 is an act executed by the hub module 125, wherein that device may only be accessed and tested in that particular session, precluding multiple concurrent testing sessions on a singular device. At process 5, the hub module 125 sends confirmation back to the web module 120 with which the web module displays the confirmation by presenting the selected device(s) as unavailable or retained according to process 6.

At process 7 of the exemplary application testing initiation process, the user client 205 initiates a request to install the desired application to be tested onto the retained device(s). As previously described and as will be generally understood, the test application may be installed on various platforms according to the design of the application. Subsequently in process 8, the web module 120, forwards the request to install the test application to the hub module 125 for execution. In one embodiment, the hub module 125 handles the execution of core functions as well as accesses the database 175 where the application data is generally stored. In process 9, the hub module 125 sends the application data to the gateway module 130 to be delivered to the appropriate mobile device 170. As previously discussed, the gateway module 130 routes data, sub-routines, and commands to the appropriate device. Therefore, after the hub module 125 sends the application data to the gateway module, the gateway module routes the data to be installed on the appropriate device(s). Confirmation the application has been installed propagates back to the web (user interface) module 125 in processes 12-14 via the gateway module 130 and the hub module 125, wherein the web module 120 displays the application is installed according to process 15.

FIG. 3B illustrates the second portion of the application test initiation process, in one embodiment, once the MATS 101 and in particular the web module 120 receives and displays confirmation the application is installed, the process continues by launching the test application. In process 16, the user client 205 initiates the request to launch the newly installed application, similar to the process of initiating the request to install the application. The web (user interface) module transmits the request to launch the test application to the hub module 125 in process 17. Similarly, the hub module 125 propagates the instruction to launch the installed application to the gateway module 130, which determines the appropriate path for the application launch command. Following the direction of the gateway module 130, in process 19, the command to launch the application reaches the device 170, wherein the mobile device launches the application as shown in process 20. A confirmation message is sent from the gateway module 130 back to the web module 120 via the hub module 125 as shown in process 21 and 22. Accordingly, at process 23 the web module 120 sends the user client 205 a launch message. According to one aspect of the FIG. 3B embodiment, the exemplary application testing initiation process concludes as the user client 205 initiates a connect message to the device 170 via the device viewer 220. Similar to other aspects of the application testing initiation process, the connect messages propagates through the MATS 101 via the web module 120, the hub module 125, and the gateway module 130 as illustrated in processes 24-27.

FIG. 4 illustrates an exemplary application testing process on a managed mobile device 170, according to one embodiment of the MATS 101. In one embodiment, at process 1, the client/automation host 235 requests a testing session, a view of the screen of the managed mobile device 170 being tested, and an object inventory of the application being tested. As with most data transmissions during the testing process, the management server 140 functions as a mechanism with which data propagates from the client/automation host 235 to the device agent 150 and from the device agent 150 to the client/automation host 235. After receiving the data request, the device agent 150 responds to the request and sends an active display of the managed mobile device 170 (as seen and further described in connection with FIG. 6), an object inventory, and an acceptance of a testing session to the client/automation host 235, as shown in process 2. The object inventory data sent from the device agent 150 generally comprises a platform specific object tree and includes all properties associated with each object within the inventory. The client/automation host converts platform-specific data to usable platform agnostic data for use by the user client 205 in creating test scripts, method calls, and click events as shown in process 3. For example, if an iOS device sends an object inventory comprising an object representing an accelerometer and an Android device sends a similar object inventory with an object representing an accelerometer to the client/automation host 235, the client/automation host 235 will merge the two objects to a platform-agnostic object that represents the accelerometer and will be recognized by the iOS device, the Android device, and the user client 205.

The MATS 101 application testing process begins an iterative repeatable portion of the process, wherein the client/automation host 235 repeatedly sends agnostic method calls and commands to the device agent 150 executing various test procedures, via either test scripts or manual testing, until the testing sequence is complete, as shown in processes 4 and 5. As previously described and shown at process 6, the data transmitted from the device agent 150 is platform specific; hence, as data arrives at the client/automation host 235, the client/automation host 235 translates the data to platform agnostic data that can be interpreted by the functional testing module 210 and the user client 205. Further, some aspects of the data may be used to update the device viewer 220 user interface, thus verifying certain aspects of the functional testing was executed accordingly. Other aspects of the data returned to the client/automation host 235 comprise data for generating a report detailing the results of the application functionality test and also concluding the process of application testing, as described in process 7 of FIG. 4. Contents of the report generally comprise pass/fail of steps, checkpoint results, timing results, screen captures, etc.

FIG. 5A illustrates an exemplary screenshot 501 of a device list according to one embodiment of the MATS 101. As previously described, the MATS 101 provides a list 505 of all devices 170 connected to the management server 140. According to one aspect, the MATS 101 comprises a device detection mechanism that enables the system to auto-detect and display a device 170 when it is connected to the system. Further, the device list enables selection of a device 170 for retaining and testing of a mobile application. For example, a user 105 can select a connect button 510 to select the desired device(s) 170 to retain. According to other aspects in connection with the FIG. 5A embodiment, the device list displays the device name, the model of the device, the operating system of the device, and the availability of the device 170.

As shown in screenshot 502 in FIG. 5B, in one embodiment, the devices 170 connected to the MATS 101 may also be displayed in a tile format. In one aspect, the tile format 515 as shown in the exemplary screenshot in FIG. 5B, displays a list of devices connected to the MATS. Similar to FIG. 5A, the tile display format shows the device name, the model of the device, the operating system of the device, and the availability of the device 170. Further, the tile display also enables retaining of a device for mobile application testing (e.g., by selecting a connect button 510 corresponding to a desired device 170).

FIG. 6 is an exemplary screenshot 600 of a device 170 user interface as displayed on the device viewer 220. According to one embodiment, the device viewer 220 may display the user interface of a device 170 after the device is retained. In one aspect, the device agent 150 continuously sends screenshot updates and events of the managed mobile device 170 during the mobile application testing process. In another aspect, the object spy module 230 can detect and identify various objects by querying the trust add-in 215 when the mouse pointer is placed over an object while viewing the user interface with the device viewer 220. Further, the object spy module 230 also identifies properties that are associated with the targeted object. In yet another aspect, the user interface illustrated in FIG. 6 may be seen via the device viewer 220 through a local network or through a remote connection to the MATS 101.

According to one embodiment of the MATS 101, FIG. 7 shows an exemplary screenshot 700 illustrating an interface for mobile applications intended for functional testing. According to one aspect, the interface for mobile applications comprises a mechanism for uploading and deleting applications onto or from the MATS 101. In one aspect, the interface for mobile application testing further comprises a list of uploaded applications by name and file name. Further aspects of the mobile application interface comprise a listing of operating system(s) the application is designed for, the minimum operating system version required to ensure the mobile application is compatible with the device, the application version, and the application ID.

FIG. 8 is an exemplary screenshot 800 of an object and property list with one embodiment of the MATS 101. As shown in FIG. 8, an exemplary object is identified utilizing the object spy module 230 in conjunction with the trust add-in 215. As previously described, the object spy module 230 identifies objects by querying the trust add-in 215 when placing the mouse pointer over the targeted object (or by other defined areas). For example, as the mouse pointer is positioned over an area on the user interface displayed by device viewer 220, the object spy module 230 queries the trust add-in 215 regarding the presence of any objects. Furthermore, if there is an object present, the object spy module 230 displays the object and object properties as instantiated by the trust add-in 215. In one aspect, the identified object is displayed with its accompanying properties. In yet another aspect, by clicking in the "username" edit box the trust add-in contacts the device agent 150, which displays the desired information about the target object accordingly. Further, the identified object information is made available to the functional test module 210 and the object may be added to the object repository 225 for future use or further examination.

In one embodiment, FIG. 9 illustrates an exemplary MATS 101 configured in a MATS station 900. As previously described, the MATS 101 generally comprises a management server 140 and various USB hubs 135*a, b,* and *c.* In one embodiment, the MATS 101 may comprise a mobile all-in-one station, where in the MATS station 900 comprises the necessary components to perform functional testing in one location. In one embodiment, the MATS station comprises a cart 910 with wheels 920 making it mobile and able to move to suitable locations according to testing needs. In another embodiment, the MATS station 900 may comprise a cart 910 without wheels for an immobile station that may be anchored in a desired place. Further, in one embodiment, the cart 910 comprises doors to protect the components inside (the inside components will be discussed in greater detail in connection with FIG. 10) and provides a mechanism for accessing the components inside the cart 910. In another embodiment, the cart 905 may not comprise doors and may expose the inside components enabling better accessibility to said components.

In one embodiment, the MATS station 900 further comprises a monitor 905 for interfacing with the MATS 101. The monitor generally displays the web (UI) module interface and various other interfaces of the MATS 101 as previously described in connection with FIGS. 5-8. In one aspect, the monitor may display the device viewer 220. In another aspect, the monitor may display a hypervisor or virtual machine for connecting to the MATS 101. In one aspect, the monitor 905 may be placed on top of the cart 910 as illustrated in FIG. 9. In another aspect, the monitor 905 may be integrated with the cart 910, wherein the cart is constructed with a transparent top displaying a monitor or screen located inside the cart. In yet another aspect, the cart 910 may not comprise a monitor 910 and may be moved to a location where a monitor resides and the monitor is plugged into the MATS station 900. In another aspect, the monitor 905 may be affixed to a remote user station 107. Further, in one aspect, the monitor 905 may comprise a touch screen, wherein engaging various aspects on the screen is executed by touching desired locations and utilizing various interfaces within the screen. In another aspect, the MATS station 900 may comprise a keyboard 930 and mouse 925 as mechanism for interfacing with the monitor 905 and the MATS station.

Referring now to FIG. 10, the MATS station 900 further comprises a plurality of components within the cart 910, according to one embodiment of the MATS station 900. In one aspect, the interior of the cart 910 generally comprises a plurality of shelves 935 in which the various interior components are placed. In the configuration illustrated in FIG. 10, the cart 910 comprises three shelves 935, but as will be generally understood by one of ordinary skill in the art, the cart 910 may comprise fewer or more shelves 935 depending on the needs and design of the MATS station 900. In another aspect, the interior of the cart further comprises dividers 940 to separate the shelves 935 into small compartments to house various mobile devices 170.

In one embodiment, the interior components generally comprise a management server 140. As previously described, the management server 140 generally functions as an intermediate mechanism between a user 105 and the devices 170 and generally comprises the web module 120, the hub module 125, and the gateway module 130. According to one aspect, the management server 140 is an Apple Mac Mini, but as will be understood by one of ordinary skill in the art, the management server 140 may comprise a PC, a rack server, a tower server, or anything of the like. Further, the MATS station 900 may comprise any number of management servers within the MATS station 900.

According to one embodiment of FIG. 10, the interior components of the MATS station 900 further comprise a USB hub 135 for aggregating all of the devices 170 within the MATS station 900. In one aspect, the USB hub 135 expands the Ethernet to USB protocol transformation to support more devices 170 through USB capability expansion. In another aspect, the MATS station 900 generally comprises 1-3 USB hubs 135 connected to the device gateway 130, but any number of USB hubs may be utilized according to the needs of the system and the system design. According to yet another aspect, the USB hub 135 enables the MATS 101 to communicate with each port further expanding the MATS 101 functionality. For example, utilizing MATS 101, each port can be turned on/off and execute various other functions. In one aspect, the USB hub 135 is operatively connected to the devices 170, the server 140, and other components. Further, the USB hub 135 is used for exemplary purposes only, as will be generally understood, the MATS station 900 may comprise other connecting mechanism, such as a directly wired hub (where wires are soldered into a hub), docking station with multiple ports, etc.

As will be generally understood, the MATS station 900 generally comprises a cart and all-in-one station, but it is not necessary for the MATS 101 to be organized in to mobile station. The aforementioned example is utilized for exemplary purposes only and is not intended to limit the scope or spirit of the present disclosure. Further, in one embodiment, each component of the MATS 101 may be located at various locations on-site or off-site.

Accordingly, it will be understood that various embodiments of the present system described herein are generally implemented as a special purpose or general-purpose computer including various computer hardware as discussed in greater detail below. Embodiments within the scope of the present invention also include computer-readable media for carrying or having computer-executable instructions or data structures stored thereon. Such computer-readable media can be any available media which can be accessed by a general purpose or special purpose computer, or downloadable through communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the invention may be implemented. Although not required, the inventions are described in the general context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the invention may be practiced in network computing environments with many types of computer system configurations, including personal computers, hand-held devices, multi-processor systems, microprocessor-based or programmable consumer electronics, networked PCs, minicomputers, mainframe computers, and the like. The invention is practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the inventions, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, a script containing computer program code written in a scripting language or other input devices (not shown), such as a microphone, etc. These and other input devices are often connected to the processing unit through known electrical, optical, or wireless connections.

The main computer that effects many aspects of the inventions will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the invention is connected to the local network through a network interface or adapter. When used in a WAN or WLAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

In view of the foregoing detailed description of preferred embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernible from the description herein, by those of ordinary skill in the art. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously.

What is claimed is:

1. A method for testing one or more software applications on a plurality of devices via a management computer system, wherein the management computer system is operatively connected to the plurality of devices and to one or more user machines associated with one or more users desirous of testing the one or more software applications on the plurality of devices, the method comprising the steps of:

receiving a request at the management computer system from a specific user machine for testing a particular software application installed on a particular device of the plurality of devices;

retrieving device information from a device agent running on the particular device, wherein the device information includes an object inventory of platform-specific objects associated with the particular software application and each of the plurality of platform-specific objects corresponding to at least one application function;

generating a common object model based on the object inventory of platform-specific objects and the particular operating platform associated with the particular device;

receiving a platform-agnostic functional application testing command at the management computer system from the specific user machine for testing the particular software application on the particular device, the platform-agnostic functional application testing command comprising at least one object and a testing action;

determining, from the common object model, a platform-specific object associated with the particular software application corresponding to the at least one object defined in the platform-agnostic functional application testing command; and generating and transmitting a platform-specific functional application testing command to the device agent for testing the particular software application on the particular operating platform of the particular device, wherein the platform-specific functional application testing command is translated from an automated platform-agnostic testing command received based on the object inventory of the plurality of platform-specific objects, at least one of the plurality of platform-specific objects corresponding to the at least one application function, and based on a single testing command of a plurality of testing commands that represent a particular functionality of the mobile software application to be executed on at least one object of the plurality of objects.

2. The method of claim 1, wherein the common object model comprises a plurality of common objects mapped to a corresponding plurality of platform-specific objects.

3. The method of claim 1, wherein the common object model is generated via the management computer system.

4. The method of claim 1, wherein the common object model is generated at the specific user machine via a client module.

5. The method of claim 1, further comprising the steps of:
receiving platform-specific test event data from the device agent of the particular device in response to the platform-specific functional application testing command; and
providing the platform-specific test event data to the specific user machine for display to a user.

6. The method of claim 5, wherein the platform-specific test event data includes one or more of the following: event information, event responses, screen captures, reporting data.

7. The method of claim 6, wherein the screen captures are object-based.

8. The method of claim 1, further comprising the step of generating a generic pathway via the management computer system for exchanging data between the device agent of the particular device and the specific user machine.

9. The method of claim 8, wherein the generic pathway is generated via a multiplexor.

10. The method of claim 1, wherein the step of transmitting the platform-specific functional application testing command to the device agent for testing the particular software application on the particular device further comprises transmitting the platform-specific functional application testing command to a particular communication socket on a hub, wherein the particular communication socket is associated with the particular device and routes the platform-specific functional application testing command to the particular device.

11. The method of claim 10, wherein the hub comprises a USB hub for aggregating the plurality of mobile devices to the management computer system.

12. The method of claim 1, wherein the management server comprises a USB server.

13. A system for testing one or more software applications on a plurality of devices, comprising:
  a server operatively connected to a plurality of devices and to one or more user machines associated with one or more users desirous of testing one or more software applications on the plurality of devices;
  a database for storing information relating to: (a) the one or more software applications, and (b) a common object model that maps platform-specific objects associated with particular software applications and particular operating platforms to platform-agnostic objects; and
  a processor operatively coupled to the server and the database, wherein the processor is operatively configured to:
    receive a request from a specific user machine for testing a particular software application installed on a particular device of the plurality of devices;
    retrieve device information from a device agent running on the particular device, wherein the device information includes an object inventory of platform-specific objects associated with the particular software application and a particular operating platform of the particular device;
    retrieve the common object model from the database;
    receive a platform-agnostic functional application testing command from the specific user machine for testing the particular software application on the particular device, the platform-agnostic functional application testing command comprising at least one object and a testing action;
    determine, from the common object model, a platform-specific object associated with the particular software application corresponding to the at least one object defined in the platform-agnostic functional application testing command; and
    generate and transmit a platform-specific functional application testing command to the device agent for testing the particular software application on the particular operating platform of the particular device, wherein the platform-specific functional application testing command is translated from an automated platform-agnostic testing command received based on the object inventory of the plurality of platform-specific objects, at least one of the plurality of platform-specific objects corresponding to the at least one application function, and based on a single testing command of a plurality of testing commands that represent a particular functionality of the mobile software application to be executed on at least one object of the plurality of objects.

14. The system of claim 13, wherein the processor is further operatively configured to:
  receive platform-specific test event data from the device agent of the particular device in response to the platform-specific functional application testing command; and
  provide the platform-specific test event data to the specific user machine for display to a user.

15. The system of claim 14, wherein the platform-specific test event data includes one or more of the following: event information, event responses, screen captures, reporting data.

16. The system of claim 15, wherein the screen captures are object-based.

17. The system of claim 13, wherein the processor is further operatively configured to generate a generic pathway for exchanging data between the device agent of the particular device and the specific user machine.

18. The system of claim 17, wherein the generic pathway is generated via a multiplexor.

19. The system of claim 13, wherein the step of transmitting the platform-specific functional application testing command to the device agent for testing the particular software application on the particular device further comprises transmitting the platform-specific functional application testing command to a particular communication socket on a hub, wherein the particular communication socket is associated with the particular device and routes the platform-specific functional application testing command to the particular device.

20. The system of claim 19, wherein the hub comprises a USB hub for aggregating the plurality of mobile devices to the server.

* * * * *